US010122560B2

(12) United States Patent
Tosato et al.

(10) Patent No.: US 10,122,560 B2
(45) Date of Patent: Nov. 6, 2018

(54) TREE SEARCH TONE RESERVATION FOR PAPR REDUCTION IN OFDM SYSTEMS

(71) Applicant: Kabushiki Kaisha Toshiba, Minato-ku (JP)

(72) Inventors: Filippo Tosato, Bristol (GB); Magnus Stig Torsten Sandell, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/550,947

(22) PCT Filed: Oct. 16, 2015

(86) PCT No.: PCT/GB2015/053089
§ 371 (c)(1),
(2) Date: Aug. 14, 2017

(87) PCT Pub. No.: WO2017/064448
PCT Pub. Date: Apr. 20, 2017

(65) Prior Publication Data
US 2018/0034675 A1  Feb. 1, 2018

(51) Int. Cl.
*H04L 27/28* (2006.01)
*H04L 27/26* (2006.01)
*H04L 25/03* (2006.01)

(52) U.S. Cl.
CPC .... *H04L 27/2618* (2013.01); *H04L 25/03242* (2013.01); *H04L 27/2626* (2013.01)

(58) Field of Classification Search
CPC .................................................. H04L 27/2628
USPC ........................................................ 375/260
See application file for complete search history.

(56) References Cited

U.S. PATENT DOCUMENTS

2009/0323513 A1* 12/2009 Yin ..................... H04L 27/2623
370/210
2010/0124293 A1*  5/2010 Rajagopal ........... H04L 25/0226
375/260

OTHER PUBLICATIONS

International Search Report and Written Opinion dated Jun. 21, 2016 in PCT/GB2015/053089.
Meng Wang, et al., "A Complex-Baseband Active-Set Approach for Tone Reservation PAR Reduction in OFDM Systems", Communications Theory Workshop, XP031235370, Jan. 30, 2008, pp. 113-118.
Brian S. Krongold, et al., "A New Tone Reservation Method for Complex-Baseband PAR Reduction in OFDM Systems", 2002 IEEE International Conference on Acoustics, Speech , and Signal Processing, vol. 3, XP10803866, May 13, 2002, pp. 2321-2324.

* cited by examiner

*Primary Examiner* — Kevin Kim
(74) *Attorney, Agent, or Firm* — Oblon, McClelland, Maier & Neustadt, L.L.P.

(57) ABSTRACT

An OFDM transmitter comprising an input for acquiring or receiving a signal to be transmitted, an output for transmitting a PAPR reduced version of the signal, a processor and memory storing code for execution by the processor. The processor, when executing the code, is configure to determine a plurality of possible values of tone reservation, hereinafter referred to as TR, tones for use in TR based PAPR reduction and to perform a tree search over some or all of the possible values under a first constraint that the average power per TR tone does not exceed the average power per tone used for data transmission and a second constraint that selected values for the TR tones reduce PAPR.

13 Claims, 7 Drawing Sheets

TREE SEARCH TONE RESERVATION FOR PAPR REDUCTION IN OFDM SYSTEMS

FIELD

Embodiments described herein relate generally to reducing peak-to-average power ratio (PAPR) in OFDM systems.

BACKGROUND

OFDM is a type of modulation that is widely used in high data rate wireless transmission because it allows to transform a wideband channel in a set of parallel narrowband channels, which greatly simplifies equalisation, channel estimation, resource allocation etc. For low mobility and large packet size wireless transmission, spectral efficiency can be increased by expanding the OFDM symbol size. In DVB-T2 (digital video broadcasting-second generation terrestrial) and ultra-high-definition TV (UHDTV or super hi-vision, SHV), the OFDM symbol size can be as large as $2^{15}$ subcarriers. One of the drawbacks of a very large OFDM symbol size is the increased peak-to-average power ratio (PAPR) of the time-domain signal. A large PAPR causes nonlinearity problems and power losses at the power amplifier (PA) as this is forced to operate at lower efficiency.

The performance of a power amplifier (PA) in an OFDM system is greatly affected by the ratio between peak and average power (PAPR) in the time domain signal and the probability distribution of the transmit signal. These parameters are all the more critical in OFDM systems with a large number of subcarriers such as existing and future digital TV broadcasting systems like DVB-T2 and Super Hi-Vision (SHV), where the OFDM symbol size can scale up to 32 K subcarriers.

A number of different techniques have been developed for PAPR reduction in OFDM systems. One strategy for PAPR reduction is tone reservation (TR), whereby a set of subcarriers are not used for data but reserved for a PAPR reduction dummy signal that is orthogonal to the data signal. Through the use of reserved tones the data signal is unaffected. Several techniques are available to calculate the signal for the reserved tones. In one algorithm signal peaks are cancelled iteratively in the time domain by using a set of impulse-like kernels made available by the reserved subcarriers. Another technique, TR using active sets (TR-AS; Krongold, B., Jones, D. (2004, February), An Active-Set Approach for OFDM PAR Reduction via Tone Reservation, *IEEE Transactions on Signal Processing*, 52(2), 495-509), operates by iteratively cancelling signal peaks by adding a new peak to the set of peaks to be reduced simultaneously at each iteration.

Although some of these techniques achieve good performance, they offer diminishing returns for increased complexity. Therefore, PAPR tends to reach a plateau after the first few iterations and no significant further reduction results from allowing more complexity. Moreover, it is not clear how far this plateau is from optimal, i.e., what is the lowest possible PAPR that can be achieved with a given number of reserved tones and limit on the average power per tone of the TR signal.

BRIEF DESCRIPTION OF THE DRAWINGS

In the following, embodiments will be described with reference to the drawings in which.

DETAILED DESCRIPTION

Figure 1:
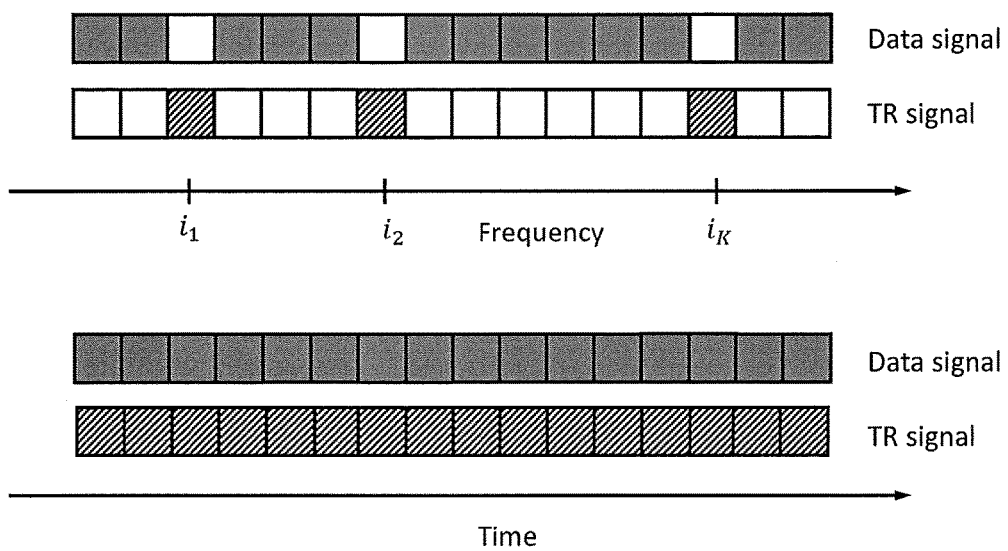
FIG. 1 illustrates the principle of tone reservation (TR)

According to an embodiment there is provided a tone reservation, hereinafter referred to as TR, method for reducing PAPR of an OFDM signal. The method comprises determining a plurality of possible values for TR tones to be used, performing a tree search over some or all of the possible values under a first constraint that the average power per TR tone does not exceed the average power per tone used for data transmission and a second constraint that selected values for the TR tones reduce PAPR.

The method may further comprise determining a first search radius so that, for a search sphere centered on the data signal and having the first search radius, the possible values for the TR tones within the sphere are such that the average power of the TR tones does not exceed the average power of the tones used for data transmission and/or determining a second search radius so that, for a search sphere centered on the data signal and having the second search radius, the possible values for the TR tones within the sphere are such that the selectable values reduce PAPR.

The method may further comprise selecting as a search radius the smaller one of the first and second search radii and reducing the selected radius by the norm of the data signal.

The method may further comprise selecting, in the tree search, a value for a TR tone in each search step. A search step comprises selecting a search range under the first and second constraints and taking previously selected TR tone values into account and performing a search over some or all of the plurality of possible values within the search range.

The method may further comprise determining an end point of the search range by reducing the search radius so that only the possible values that, when used in combination with any previously selected values, fulfil the first constraint fall within a sphere with the reduced radius, wherein the reduced search radius is centered on the data signal.

The method may further comprise terminating the search if a predetermined number of search steps have been performed or if a pre-allocated time allowance for the search has passed.

According to another embodiment there is provided a non-transient data carrier storing instructions for execution by a processor, the instructions, when executed by the processor cause the processor to perform any of the above described methods.

According to another embodiment there is provided a PAPR reducing unit for an OFDM transmitter. The PAPR reducing unit comprising an input for acquiring or receiving a signal to be transmitted, an output for transmitting a PAPR reduced version of the signal and a processor and memory storing code for execution by the processor. The processor, when executing the code, is configure to determine a plurality of possible values of tone reservation, hereinafter referred to as TR, tones for use in TR based PAPR reduction, to perform a tree search over some or all of the possible values under a first constraint that the average power per TR tone does not exceed the average power per tone used for data transmission and a second constraint that selected values for the TR tones reduce PAPR.

The processor may further be configured to determine a first search radius so that, for a search sphere centered on the data signal and having the first search radius, the possible values for the TR tones within the sphere are such that the average power of the TR tones does not exceed the average power of the tones used for data transmission and/or to determine a second search radius so that, for a search sphere centered on the data signal and having the second search radius, the possible values for the TR tones within the sphere are such that the selectable values reduce PAPR.

The processor may further be configured to select as a search radius the smaller one of the first and second search radii and to reduce the selected radius by the norm of the data signal.

The processor may further be configured to select in each search step of the tree search a value for a TR tone. In each search step the processor is configured to select a search range under the first and second constraints, taking previously selected TR tone values into account and to perform a search over some or all of a plurality of the possible values within the search range.

The controller may further be configured to determine an end point of the search range by reducing the search radius so that only possible values that, when used in combination with any previously selected values, fulfil the first constraint fall within a sphere with the reduced radius. The reduced search radius is hereby centered on the data signal.

The controller may further be configured to terminate the search if a predetermined number of search steps have been performed or if a pre-allocated time allowance for the search has passed.

According to another embodiment there is provided a converter comprising an input for receiving a data for conversion, an OFDM modulator configured to generate OFDM signals from the data and any of the above described PAPR reducing units.

According to another embodiment there is provided an OFDM transmitter that comprises the above mentioned converter, a power amplifier connected to receive an output signal from the PAPR reducing unit and a transmit antenna connected to receive an amplified signal from the power amplifier. The OFDM transmitter may be an access point, a base station, a TV broadcaster or a wearable device.

The principle of the tone reservation technique for PAPR reduction is illustrated in FIG. 1. A number of subcarriers in an OFDM symbol are reserved for the PAPR reduction signal. No data is transmitted on the reserved tones and no TR signal appears in the data subcarriers, hence the data and TR signals are orthogonal in frequency. The time domain signal is simply given by the superposition of the two signals. The decoder can simply discard the TR values without affecting the data error rate performance. However, the power in the reserved tones need to be constrained otherwise most of the transmit power could be used for the TR signal at the expense of the actual data signal. The TR power constraint can be either 1) on the maximum amplitude of a reserved tone or 2) on the average reserved tone power per OFDM symbol.

The idea behind both the DVB-T2 and the active set TR algorithms is to cancel signal peaks in the time domain iteratively by using a set of impulse-like kernels made available by the reserved subcarriers. The reference time-domain kernel corresponds to the inverse Fourier Transform of a signal with elements of ones in the TR positions and zeros elsewhere. The reference kernel is time-shifted such that its peak corresponds to the data signal peak to be cancelled and adjusted in phase and amplitude. TR-AS offers the advantage of reducing a set of peaks simultaneously and a new peak is added to the set at each iteration. This method was shown to converge to the optimal solution in a finite number of steps when there are no constraints on the power of the reserved tones. However, convergence to the optimal solution is no longer guaranteed when a limit is imposed on the TR signal power. This limit is necessary in practice to avoid allocating too much power to the TR signal at the expense of the data signal.

Instead of peak cancellation, the principle behind the method of the embodiment is a tree-like search over the complex space of possible values for the reserved tones. The search space consists of all the combinations of complex values that can be assigned to the reserved tones. Because of its sheer size, an exhaustive search in this space would be unfeasible. One embodiment consequently applies two strategies to restrict it:

1) The search space is quantised by a lattice, namely the Cartesian product of the Gaussian integer grid. A parameter, $\tau$, controls the spacing between the lattice points, such that for $\tau \rightarrow 0$ the integer grid converges to the whole complex field.
2) The constraints on the max norm of the time-domain signal and the power of the TR signal are used to reduce the size of the search space.

When a candidate point of the lattice within the sphere is tested the PAPR that would be produced if the values represented by the lattice points were used is determined. In one embodiment a stopping rule is used to limit the execution time. The execution/search time may, in particular be limited to a time period that ensures that the PAPR reduced signal is generated in time for the PAPR reducing unit to be available to calculate TR tones for the next signal in a manner that does not cause delay in the transmission chain. This may mean that the PAPR reduction method, including the tree search, has to be completed in under 1 ms. Once the stopping criterion is met or all the candidate points are visited, the lattice point that provides the lowest PAPR is output.

An OFDM system with N subcarriers and an oversampling factor L is considered in the following. Let us denote with u the NL×1 zero-padded frequency-domain data signal, with $F^{-1}$ the size-NL IDFT matrix and let $i_1, \ldots, i_K$ be the frequency locations of the K TR tones. Note that the components of u in the TR locations are zero. Let r be the TR signal in the frequency-domain with $r_j=0$ for $j \neq i_1, \ldots, i_K$. The oversampled time-domain signal is given by $x=F^{-1}(u+r)$ and the PAPR is defined as:

$$PAPR = \frac{\|x\|_\infty}{E[|x_n|^2]} \quad (1)$$

Because the average transmit power is fixed, the problem of minimising the PAPR becomes one of choosing the K nonzero complex values of r that minimise the numerator of equation (1).

Let $\lambda \in \mathbb{Z}[j]^{NL}$ denote an element of the NL-time Cartesian product of the Gaussian integer grid and let $r=\tau\lambda$, where $\tau$ is a nonnegative scaling factor, which we refer to as inflation factor. The problem of finding the TR signal for minimum PAPR can be formulated as follows $$\min_{\lambda \in \mathbb{Z}[j]^{NL}} \|F^{-1}(u - \tau\lambda)\|_\infty \quad (2)$$

subject to the constraint that the average TR power does not exceed the average data power, i.e.

$$\tau^2 \|\lambda\|_2^2 \leq \frac{K}{(N-K)} \|u\|_2^2 \quad (3)$$

The left-hand side of equation (3) calculates the power in all of the TR tones, whereas the right-hand side calculates the power in the data signal. To allow a comparison between the sides the right hand side is normalised by dividing by the number of active tones and multiplied by the number K of TR tones. Outside the TR locations the components of the translate $\tau\lambda$ are zero. Hence, the search in equation (2) is restricted to a K-dimensional lattice $\mathbb{Z}[j]^K$ as NL-K coordinates are set to zero.

Figure 2:
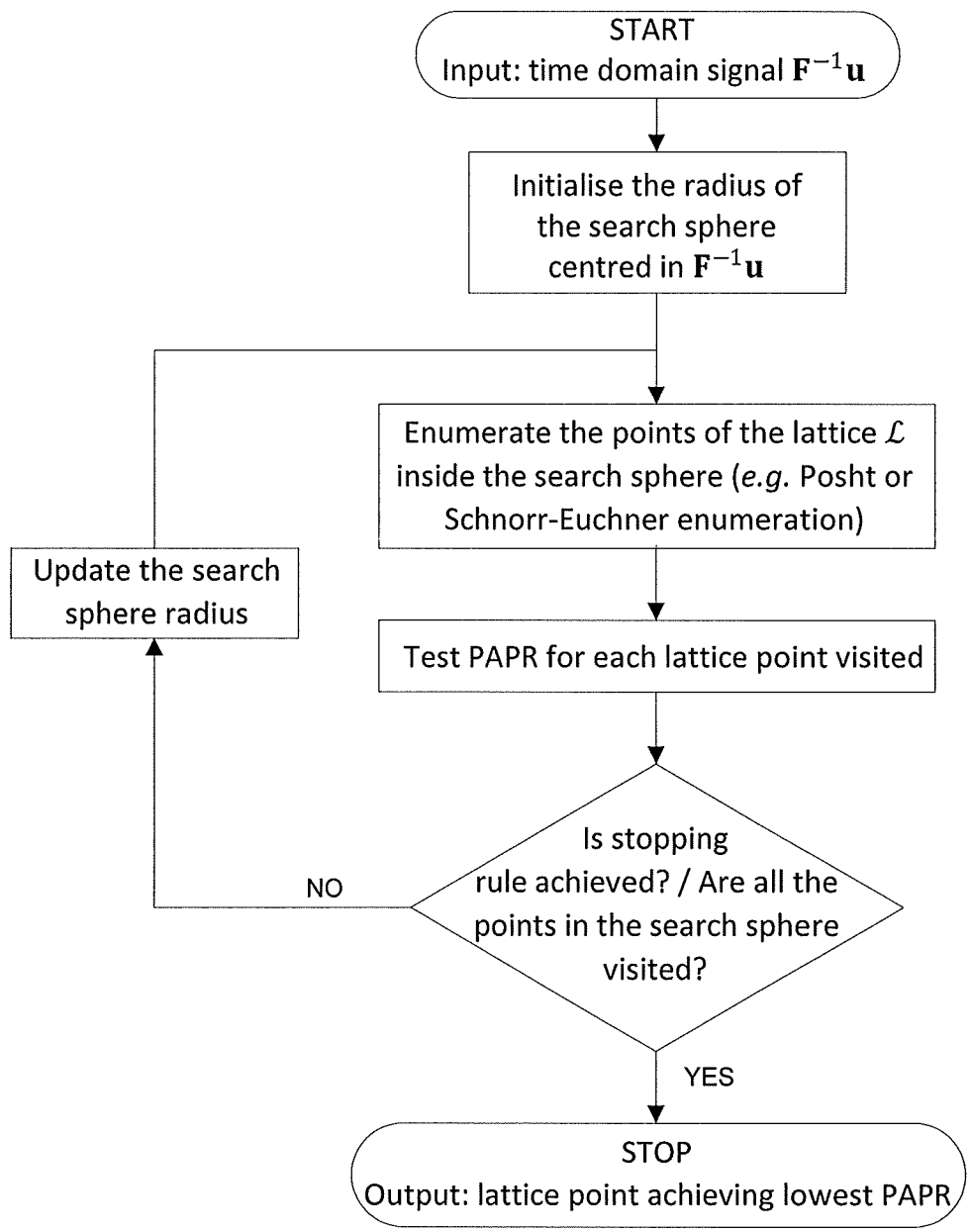
FIG. 2 shows a flow chart of the sphere search TR algorithm.

FIG. 2 is a flow chart of the sphere search TR method. The time-domain data signal is given by $F^{-1}u$. Firstly, the initial search radius is calculated by applying two constraints. The first one is the average TR power constraint of equation (3), which can be written as $$\|F^{-1}(u - \tau\lambda)\|_2^2 \leq \left(1 + \frac{K}{N-K}\right)\|u\|_2^2 \triangleq R_1^2 \quad (4)$$

The second constraint arises from the implicit condition that the lattice translate should lower the PAPR, $$\|F^{-1}(u - \tau\lambda)\|_\infty < \|F^{-1}u\|_\infty \triangleq C_0. \quad (5)$$

In order to explore the search space in a tree-like fashion the lattice points inside the search space are enumerated. For this purpose the constraint of equation (5) is transformed into a 2-norm constraint. This is because unitary matrices like $F^{-1}$ are not isometries with respect to the p-norm for p>2, including the max- or $\infty$-norm. It is can be shown that the smallest multi-dimensional sphere containing the hyper-square defined by equation (5) has radius $R_0$ such that $$\|F^{-1}(u - \tau\lambda)\|_2^2 < K\|F^{-1}u\|_2^2 \triangleq R_0^2 \quad (6)$$

Figure 3:
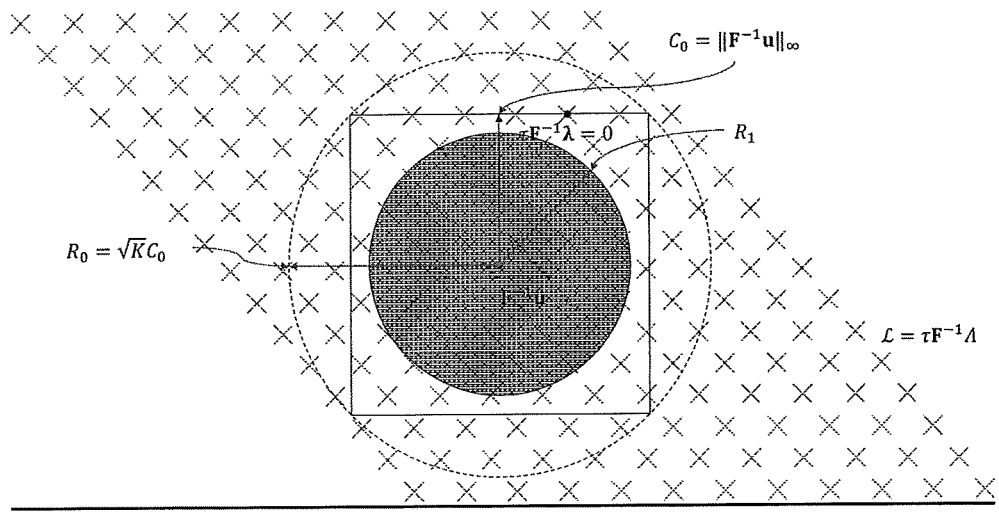
FIG. 3 shows a representation of the sphere search space for TR, in the case of a real-valued signal with K=2.

Note that K is the number of nonzero coordinates of the lattice. It is desirable to minimise the sum of the power invested into TR tones. To ensure that low power TR tones are searched earlier than higher power TR tones the initial search sphere is centred in $F^{-1}u$. The radius of this search sphere is given by $\min\{R_0, R_1\}$. The lattice in the search space is given by the inflated and Fourier-transformed integer grid $$\mathcal{L} = \tau F^{-1}\Lambda, \Lambda = \{0\} \times \ldots \times \mathbb{Z}[j] \times \ldots \times \{0\} \quad (7)$$

where $\Lambda$ denotes the Cartesian product of K Gaussian integer grids, corresponding to the TR locations and NL-K zero coordinates. Because there is a one-to-one mapping between the points of $\mathbb{Z}[j]^K$ and those of $\mathcal{L}$, the actual search is carried out in the integer lattice FIG. 3 illustrates the sphere search concept in the case of a real valued signal with K=2, N>K. The inner solid circle represents the power constraint of equation (4), whilst the solid square corresponds to the max-norm constraint of equation (5). The outer dashed circle illustrates the modified max-norm constraint provided by equation (6) and the intersection between the two circles, depicted by the shaded area is the initial search sphere. The x's mark the points of the lattice $\mathcal{L}$ defined by equation (7). The border of the square shown in FIG. 3 contains those points for which no PAPR change is achieved. For this reason the origin, i.e. the zero-coordinate point, is located on the square border in this embodiment.

In the second functional block of FIG. 2 the points of the lattice inside the search sphere are enumerated by calculating the range of values that lie within the radii R0 and R1 for each nonzero coordinate $i_1, \ldots, i_K$. It can be shown that the range of lattice points to be visited for the (TR tone) coordinate $i_k$ is a function of the values taken by the previously determined (TR tone) coordinates $i_{k+1}, \ldots, i_K$.

The order in which the coordinates are visited can be changed by applying a simple permutation. It can be shown that the range of values is given by:

$$\lambda_{i_k} \in \mathcal{I}(\lambda_{i_{k+1}}, \ldots, \lambda_K) = [A(\lambda_{i_k}), B(\lambda_{i_k})], \text{ for } k = K, \ldots, 1 \quad (8)$$

$$B(\lambda_{i_k}) = \left\lceil \sqrt{R_{min}^2 - \sum_{j=k+1}^{K} |\lambda_{i_j}|^2} \right\rceil \quad (9)$$

$$A(\lambda_{i_k}) = -B(\lambda_{i_k}) \quad (10)$$

with $$R_{min}^2 = \frac{1}{\tau^2}\min\{R_0^2, R_1^2\} - \frac{\|u\|_2^2}{\tau^2}. \quad (11)$$

The order in which each interval is explored can be, for example, the natural one, corresponding to the original Posht enumeration, i.e., $A(\lambda_{i_k}), A(\lambda_{i_k})+1, \ldots, B(\lambda_{i_k})$, or the Schnorr-Euchner order, i.e., in zig-zag fashion 0, +1, −1, +2, −2, ....

When an admissible point of the search lattice is visited, the PAPR or the combined data+TR signal is tested and if the new PAPR is lower than the PAPR of the lattice point that had previously produced the lowest PAPR, the new lattice point becomes the best candidate. In this case the value of $C_0$ is updated and the upper bound of the search interval of equation (9) recalculated, which can further reduce the size of the search region. This can be expressed as:

$$C_0 \leftarrow C \text{ if } C = \|F^{-1}(u-\tau\lambda)\|_\infty < C_0. \quad (12)$$

This operation requires the calculation of the Fourier transform of the lattice point $F^{-1}\lambda$. Because $\lambda$ is a sparse vector of integers the calculation can be greatly simplified. Moreover, because the range of integer values to explore for each coordinate is small the implementation of the integer IFFT could be done by using look-up tables. Because of the tree nature of the search, most values in the $\lambda$ vector are the same for many nodes, hence the IFFT calculation could be further simplified by using previously computed transforms.

Once a TR tone has been determined $R_{min}$ may be re-calculated by re-calculating both $R_0$ and $R_1$, taking the reduction in PAPR achieved by the already determined TR tone into account. In this manner the search radius for subsequent searches can be further reduced, thereby aiding rapid convergence of the search. In one embodiment $R_{min}$ is re-calculated after each determined TR tone, although, whilst being advantageous, updating $R_{min}$ in this manner is not essential.

The algorithm stops when a stopping rule is met, for example, a limit in the computation time or a maximum number of points are visited and/or the exploration of the search space is finished. The output of the procedure is given by the lattice point found in the search that yields the largest PAPR reduction, scaled by the parameter τ. The inflation factor τ can be chosen small enough such that the search space approximates the complex values more closely. However, simulations show that there are diminishing returns by choosing τ smaller than 1. Moreover, for small τ the number of leaf nodes increases significantly and for a limited execution time fewer coordinates can be explored. Therefore in a practical implementation the value τ=1 is found to be a good compromise between performance and complexity. Consequently, in one embodiment τ=1 is used.

Figure 4:
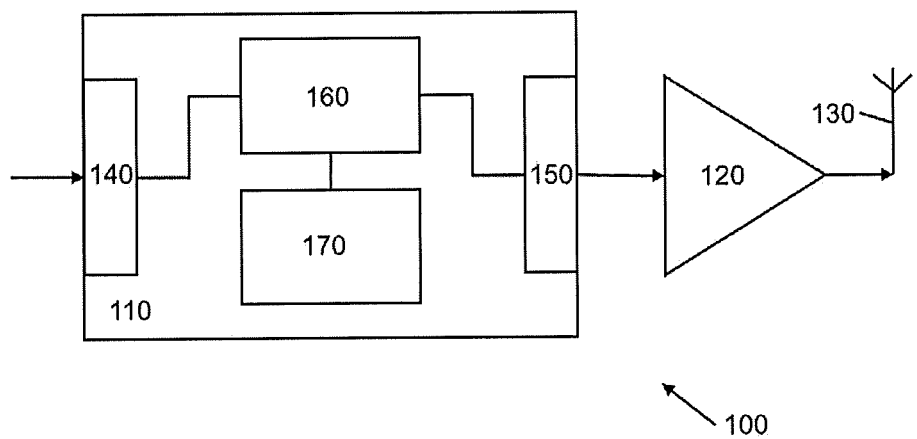
FIG. 4 shows a PAPR reduction unit including a power amplifier and antenna for an OFDM transmitter

FIG. 4 shows an OFDM transmitter 100 comprising a PAPR reducing unit 110, a power amplifier 120 and a transmission antenna 130. The PAPR reducing unit 110 receives an OFDM signal at a signal input 140 as indicated by the inward pointing arrow and transmits a PAPR reduced version of the signal from a signal output 150 to the power amplifier 120. The power amplifier 120 amplifies the PAPR reduced signal for transmission by the transmission antenna 130. Feeding a PAPR reduced signal to the power amplifier 120 enables the power amplifier 120 to be operated more efficiently than would be the case if the original OFDM signal was used for transmission.

The PAPR reducing unit 110 further comprises a processor 160 and non-volatile memory 170. The memory 170 stores instructions that executed by the processor 160. The processor 160 is configured to load instructions from the memory 170 into its own working memory for execution. The instructions, when executed by the processor 160, are such that the method described above with reference to FIGS. 2 and 3 and equations (1) to (12) is put into effect.

The sphere search TR method of the embodiment has been shown by numerical simulations to outperform the best existing algorithms for PAPR reduction that use reserved tones. The algorithm is also shown to converge to the optimal solution for small enough value of the parameter τ.

To evaluate the sphere search approach the algorithm of FIG. 2 was compared to the active set (AS) tone reservation strategy. In both solutions the average data TR power is limited, without loss of generality, to 1 for each OFDM symbol. Although the TR-AS strategy is proved to converge to the optimal TR solution when there is no limit on the TR power, this is no longer the case when we restrict the average TR power. On the other hand, the sphere search strategy does provide the optimal solution in the limit of small τ, i.e., when the lattice-induced quantisation of the search space vanishes. However, due to the diminishing returns in reducing the value of τ, the result obtained for τ=1 is acceptably close to the optimum.

Figure 5:
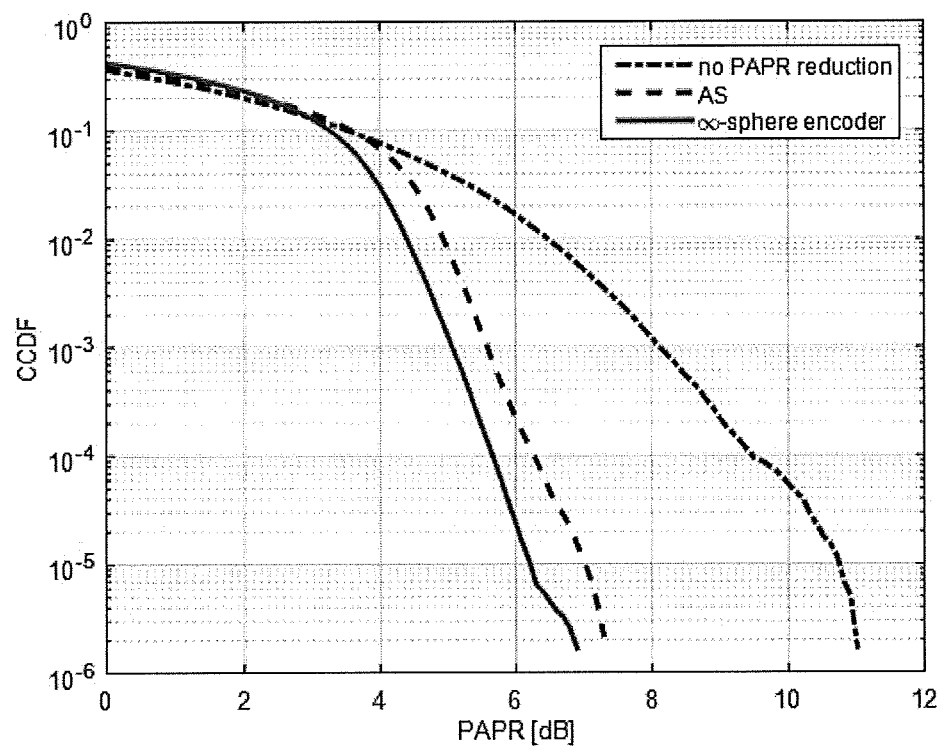
FIG. 5 shows a CCDF comparison of sphere search TR and active-set TR.
Figure 6:
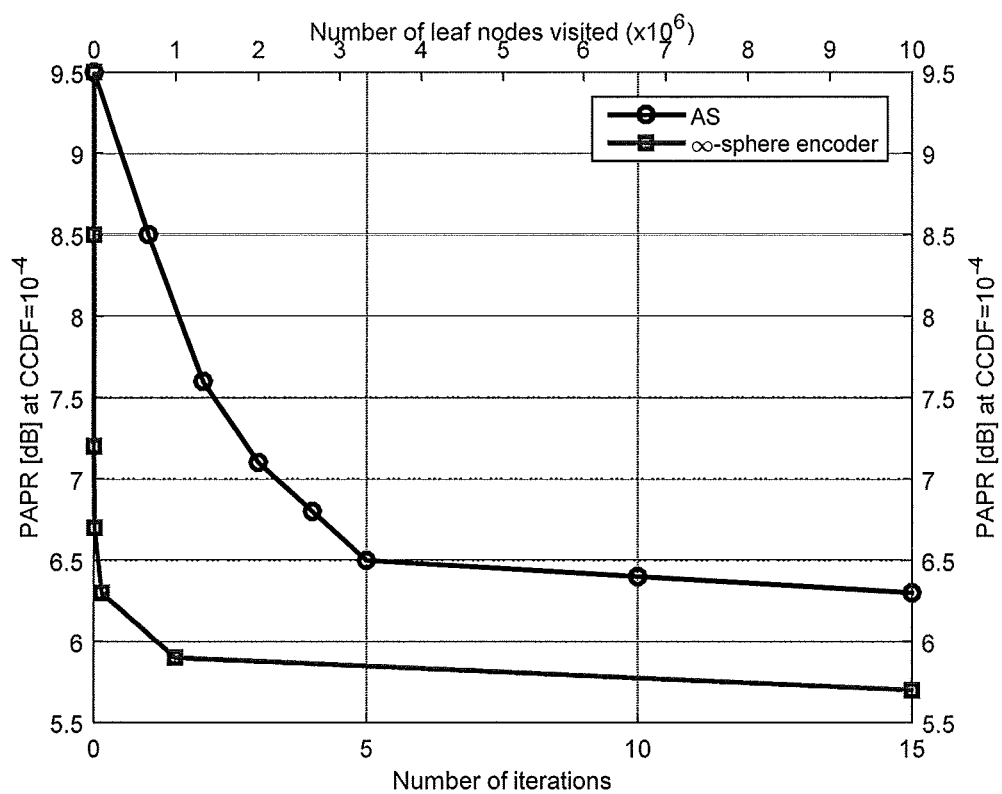
FIG. 6 shows a PAPR comparison of sphere search TR and active set TR at CCDF of $10^{-4}$.

The algorithms was tested for an OFDM system of size N=64 with $N_{act}$=45 active subcarriers and K=8 reserved tones. The oversampling ratio is L=8. FIG. 5 compares the complementary CDF of the tree/sphere search TR and TR-AS strategies, whereas FIG. 6 shows the PAPR values of the two schemes at CCDF of $10^{-4}$ for different complexities. About 1 dB difference in PARP between the two schemes in the limit of large complexity can be observed from FIG. 5.

It is not straightforward to analyse the complexity of the sphere search algorithm, given that its performance could further be improved by implementing several optimisation strategies, such as the above mentioned integer IFFT calculation. In view of this the two curves are plotted against different x-axes in FIGS. 6 and 7. In particular, for the TR-AS scheme the number of iterations is considered, whereas for the sphere search the number of leaf nodes visited by the algorithm is counted. As can be seen from FIG. 6, the complexity of achieving a given level of PAPR reduction is reduced considerably in the tree searching/ sphere encoder of the embodiment, when compared to the known TR-AS algorithm.

Figure 7:
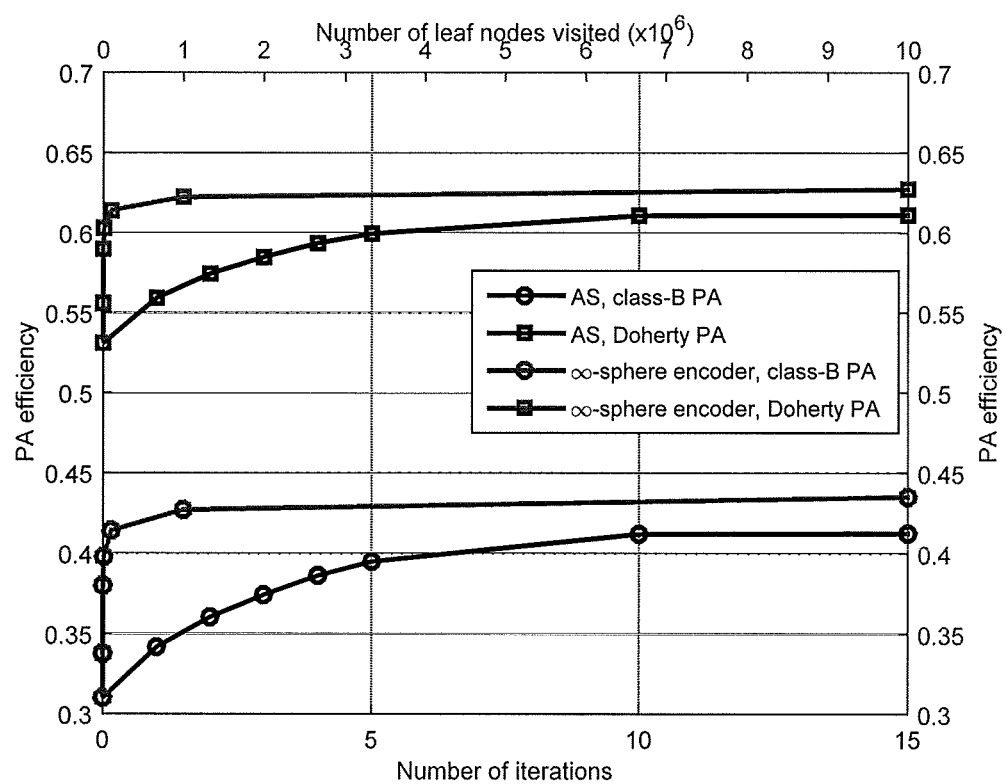
FIG. 7 illustrates a PA efficiency comparison of sphere search TR and active set TR.

FIG. 7 compares the power amplifier efficiency achieved by the two schemes at different levels of complexity. The same double x-axes plot is used as in the previous results. For both class-B and Doherty PAs the top PA efficiency is achieved by the sphere search algorithm at about 1 million leaf nodes visited. The tree/sphere searching method of the embodiment converges to the optimal solution in the pre-set limit and is shown to outperform the best of existing TR algorithms, namely TR-AS.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A tone reservation (TR) method for reducing PAPR (peak-to-average power ratio) of an OFDM (orthogonal frequency division multiplexing) signal, comprising:
   determining a plurality of possible TR tone values for use with a data signal by:
      determining a first search radius so that, for a search sphere centered on the data signal and having the first search radius, the possible values for the TR tones within the sphere satisfy a first constraint that the average power of the TR tones does not exceed the average power of the tones used for data transmission;
      determining a second search radius so that, for a search sphere centered on the data signal and having the second search radius, the possible values for the TR tones within the sphere satisfy a second constraint that the values reduce PAPR; and
   performing a search over some or all of the possible TR tone values within the first search radius and the second search radius until a stopping criteria is met.

2. A method according to claim 1, further comprising, selecting as a search radius the smaller one of the first and second search radii and reducing the selected radius by the norm of the data signal.

3. A method according to claim 2, wherein a value for a TR tone is selected in each search step, a search step comprising:
   selecting a search range under the first and second constraints and taking previously selected TR tone values into account; and
   performing a search over some or all of the plurality of possible values within the search range.

4. A method according to claim 3, further comprising determining an end point of the search range by reducing the search radius so that only the possible values that, when used in combination with any previously selected values, fulfil the first constraint fall within a sphere with the reduced radius, wherein the reduced search radius is centered on the data signal.

5. A method according to claim 1, further comprising terminating the search if a predetermined number of search steps have been performed or if a pre-allocated time allowance for the search has passed.

6. A non-transient data carrier storing instructions for execution by a processor, the instructions, when executed by the processor cause the processor to perform a method according to claim 1.

7. A PAPR (peak-to average power ratio) reducing unit for an OFDM (orthogonal frequency division multiplexing) transmitter, the PAPR reducing unit comprising:
an input for acquiring or receiving a data signal to be transmitted;
an output for transmitting a PAPR reduced version of the signal;
a processor; and
a memory storing code for execution by the processor;
the processor, when executing the code, configured to:
determine a plurality of possible tone reservation (TR) tones values for use with a data signal;
determine a first search radius so that, for a search sphere centered on the data signal and having the first search radius, the possible values for the TR tones within the sphere satisfy a first constraint that the average power of the TR tones does not exceed the average power of the tones used for data transmission;
determine a second search radius so that, for a search sphere centered on the data signal and having the second search radius, the possible values for the TR tones within the sphere satisfy a second constraint that the values reduce PAPR; and
perform a search over some or all of the possible TR tone values with the first search radius and second search radius until a stopping criteria is met.

8. A PAPR reducing unit according to claim 7, wherein the processor is further configured to select as a search radius the smaller one of the first and second search radii and to reduce the selected radius by the norm of the data signal.

9. A PAPR reducing unit according to claim 8, wherein the processor is further configured to select in each search step a value for a TR tone, the processor further configured to, in each search step:
select a search range under the first and second constraints and taking previously selected TR tone values into account; and
perform a search over some or all of the plurality of the possible values within the search range.

10. A PAPR reducing unit according to claim 9, the controller further configured to determine an end point of the search range by reducing the search radius so that only the possible values that, when used in combination with any previously selected values, fulfil the first constraint fall within a sphere with the reduced radius, wherein the reduced search radius is centered on the data signal.

11. A PAPR reducing unit according to claim 7, the controller further configured to terminate the search if a predetermined number of search steps have been performed or if a pre-allocated time allowance for the search has passed.

12. A converter comprising an input for receiving a data for conversion, an OFDM modulator configured to generate OFDM signals from the data and a PAPR reducing unit according to claim 7.

13. An OFDM transmitter comprising a converter according to claim 12, a power amplifier connected to receive an output signal from the PAPR reducing unit and a transmit antenna connected to receive an amplified signal from the power amplifier, wherein the OFDM transmitter is an access point, a base station, a TV broadcaster or a wearable device.

* * * * *